United States Patent [19]
Martel et al.

[11] 3,870,710
[45] Mar. 11, 1975

[54] CYCLOPENTANONE DERIVATIVES
[75] Inventors: Jacques Martel, Bondy; Edmond Toromanoff, Paris; Jean Buendia, Fontenay-Sous-Bois, all of France
[73] Assignee: Roussel-Uclaf, Paris, France
[22] Filed: Feb. 7, 1973
[21] Appl. No.: 330,411

Related U.S. Application Data
[62] Division of Ser. No. 138,276, April 28, 1971, Pat. No. 3,801,623.

[30] Foreign Application Priority Data
Apr. 30, 1970 France .............................. 70.15910

[52] U.S. Cl. ...... 260/240 R, 424/283, 424/305–317, 260/347.5, 260/345.8, 260/345.9, 260/348 A, 260/408, 260/410.9, 260/413, 260/447, 260/448 R, 260/468 D, 260/468 K, 260/483, 260/484 R, 260/501.1, 260/514 D, 260/514 K, 260/601 H
[51] Int. Cl. ...................... C07c 69/74, C07d 7/04
[58] Field of Search ......... 260/240 R, 468 D, 514 D

[56] References Cited
UNITED STATES PATENTS
3,678,092  7/1972  Finch .............................. 260/468 R
3,736,319  5/1973  Martel et al. ................... 260/240 R
3,801,623  4/1974  Martel et al. ................... 260/468 D FOREIGN PATENTS OR APPLICATIONS
2,104,916  4/1972  France ........................... 260/240 R OTHER PUBLICATIONS
Martel, Tetrahedron Letters, 1972, pp. 1491 to 1496.

Primary Examiner—John D. Randolph
Attorney, Agent, or Firm—Hammond & Littell

[57] ABSTRACT
Novel prostanoic acid derivatives of the formula

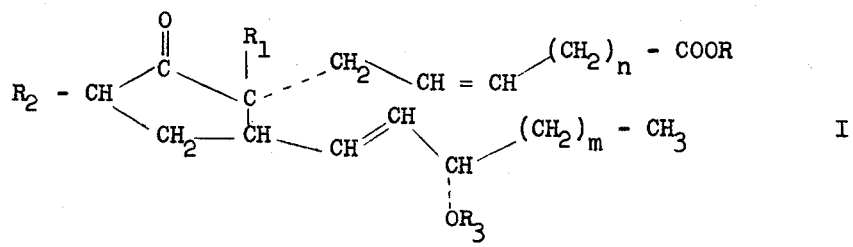

wherein R is selected from the group consisting of hydrogen and alkyl of 1 to 7 carbon atoms, $R_1$ is selected from the group consisting of hydrogen and carbalkoxy of 1 to 7 alkyl carbon atoms, $R_2$ is selected from the group consisting of hydrogen, carboxy and carbalkoxy of 1 to 7 alkyl carbon atoms, $R_3$ is selected from the group consisting of hydrogen and α-tetrahydropyranyl, $m$ is 3,4 or 5 and $n$ is 2,3 or 4 with the proviso that when $R_1$ is carbalkoxy, R is alkyl of 1 to 7 carbon atoms, $R_2$ is hydrogen and $R_3$ is α-tetrahydro pyranyl; when $R_2$ is carbalkoxy, R is alkyl of 1 to 7 carbon atoms, $R_1$ is hydrogen and $R_3$ is α-tetrahydropyranyl and when $R_2$ is carboxy, R and $R_1$ are hydrogen and $R_3$ is α-tetrahydropyranyl, which possess the physiological activity of prostaglandins, and salts thereof when R, $R_1$, $R_2$ and $R_3$ are hydrogen, with non-toxic, pharmaceutically acceptable bases and their preparation.

12 Claims, No Drawings

CYCLOPENTANONE DERIVATIVES

PRIOR APPLICATION

This application is a division of our copending, commonly assigned application Ser. No. 138,276 filed Apr. 28, 1971, now U.S. Pat. No. 3,801,623.

STATE OF THE ART

The natural compounds designed generically by the name prostaglandins have in the last few years raised increasing interest on the pharmacological level and then on the therapeutic level. Up to now, 14 prostaglandins have been isolated from human seminal liquids and these prostaglandins have been divided in groups A, B, E, F depending upon the nature of the substituent on the cyclopentanone ring.

The activity of the diverse prostaglandins seems to result from their influence on the synthesis of cyclic adenosine monophosphoric acid (cyclic AMP) whose intervention as mediator of the central nervous system is known. The prostaglandins manifest an inhibiting activity on the stimulation of the synthesis of cyclic AMP. In fact, their action is made felt among others either as antogonists to catecholamines (adrenolytic action), or as antilipolytic agents or anti-ulcergenic agents, or as factors for inhibiting blood platelet aggration.

Not all the prostaglandins manifest the same level of activity. Naimzada (Chimie therapeutique, 1969,p.34) found that prostaglandin $E_1$ is much more active than the other prostaglandins. Certain prostaglandins have not been studied very much because they have been isolated in very small quantities from seminal liquids or because of their fleeting activity.

THE INVENTION

The novel prostanoic compounds of the invention have the formula

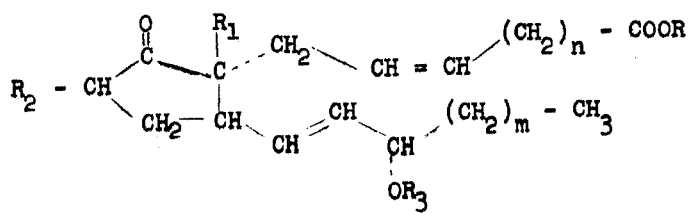

wherein R is selected from the group consisting of hydrogen and alkyl of 1 to 7 carbon atoms, $R_1$ is selected from the group consisting of hydrogen and carbalkoxy of 1 to 7 alkyl carbon atoms, $R_2$ is selected from the group consisting of hydrogen, carboxy and carbalkoxy of 1 to 7 alkyl carbon atoms, $R_3$ is selected from the group consisting of hydrogen and α-tetrahydropyranyl, $m$ is 3, 4 or 5 and $n$ is 2, 3 or 4 with the proviso that when $R_1$ is carbalkoxy, R is alkyl of 1 to 7 carbon atoms, $R_2$ is hydrogen and $R_3$ is α-tetrahydropyranyl; when $R_2$ is carbalkoxy, R is alkyl of 1 to 7 carbon atoms, $R_1$ is hydrogen and $R_3$ is α-tetrahydropyranyl and when $R_2$ is carboxy, R and $R_1$ are hydrogen and $R_3$ is α-tetrahydropyranyl and salts thereof when R, $R_1$, $R_2$ and $R_3$ are hydrogen, with nontoxic, pharmaceutically acceptable bases.

Examples of such non-toxic, pharmaceutically acceptable salts are alkali metal and alkaline earth metal salts such as sodium, potassium, calcium or magnesium; ammonium salt; and salts of aluminum or bismuth.

A particularly preferred group of compounds has the formula

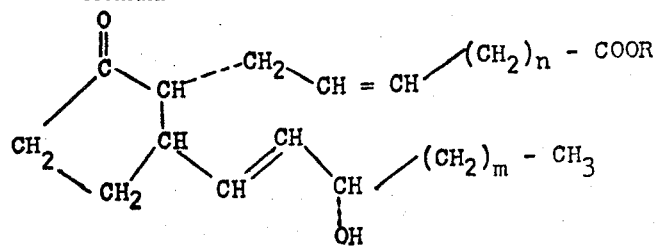

wherein R is selected from the group consisting of hydrogen and alkyl of 1 to 7 carbon atoms, $n$ is 2, 3 or 4 and $m$ is 3, 4 or 5 and non-toxic, pharmaceutically acceptable salts, thereof, when R is hydrogen.

The novel process of the invention for the preparation of compounds of formula IA comprises condensing alkyl 3-alkenyl-cyclopentanone-2-carboxylate of the formula

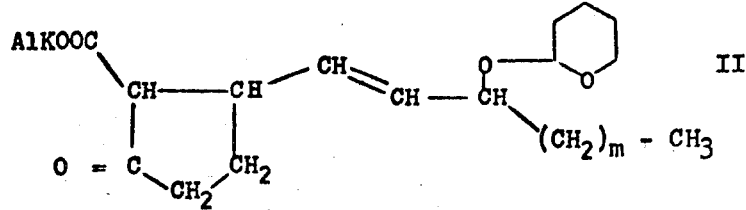

wherein AIK is alkyl of 1 to 7 carbon atoms and $m$ is 3, 4 or 5 in the presence of an alkaline agent with an alkyl haloalkenoate of the formula Hal — $CH_2$ — CH = CH — $(CH_2)_n$ — COOAlK'    III wherein Hal is chlorine or bromine, AlK' is alkyl of 1 to 7 carbon atoms and $n$ is 2,3 or 4 to form an alkyl carbalkoxy - prostadienoate of the formula

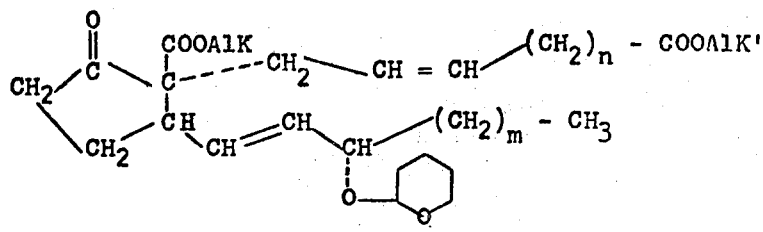

reacting the latter with an alkali metal alcoholate to form a compound of the formula

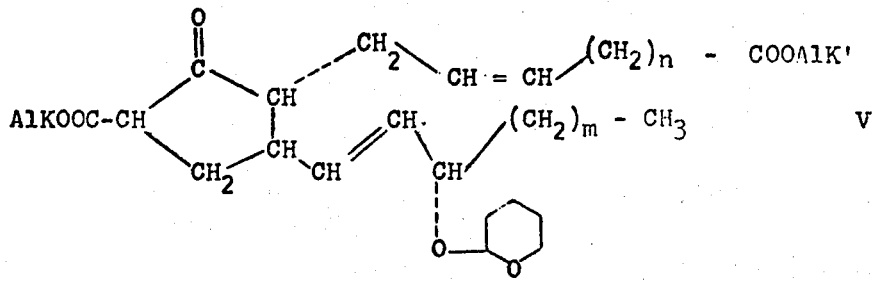

saponifying the latter with a basic agent to obtain a compound of the formula

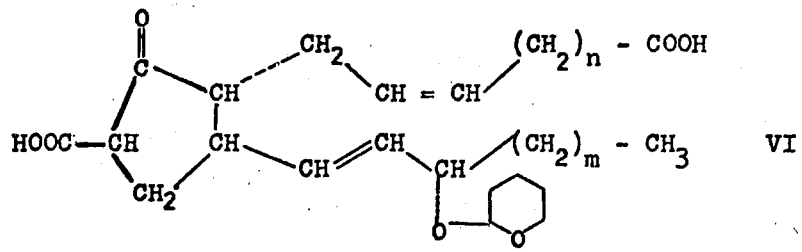

decarboxylating the latter by heating to form a compound of the formula

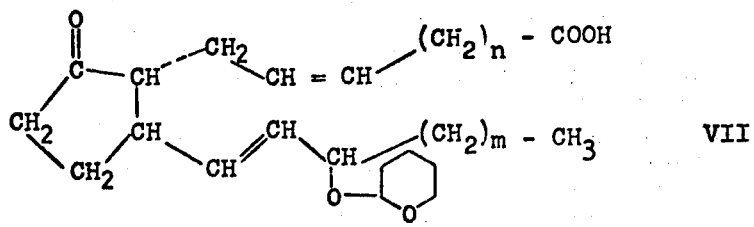

which is hydrolyzed in an acid media to form a compound of the formula

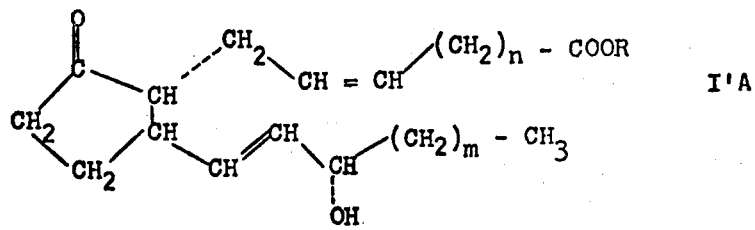

wherein R is hydrogen which can be esterified or salified by known methods to obtain the corresponding ester or salt.

In a preferred mode of the process, the alkaline agent for the condensation of esters of formulae II and III is an alkali metal alcoholate such as sodium methylate, sodium ethylate or potassium tert.-butylate. The ester of formula III is reacted with the alkali metal enolate of the compound of formula II for good yields. This reaction can be effected in a single step by a direct mixture of the three reactants or in two steps by reacting the alkali metal alcoholate with the compound of formula II to form the enolate which is then alkylated by reaction with the halo derivative of formula III. In both cases, the reaction is preferably effected in an anhydrous organic solvent such as benzene, toluene, ether, etc.

The alkali metal alcoholate reacted with the compound of formula IV is selected so that the alcoholate ion is equivalent to the Alk radical. The reaction may be effected with sodium ethylate when Alk represents ethyl or with sodium methylate when Alk represents methyl.

The saponification of the compound of formula V is preferably effected at temperatures below 50° C and with an alkali metal hydroxide such as aqueous sodium hydroxide or potassium hydroxide as the basic agent. The decarboxylation of the compound of formula VI is peferably effected by heating at 50° to 120° C in an anhydrous organic solvent, preferably benzene. The hydrolysis of the prostadienoic acid of formula VII is preferably effected with an acid agent such as oxalic acid in an organic solvent such as ethanol.

When it is desired to esterify the prostanoic acid derivatives of formula IA wherein R is hydrogen, the alcohol is reacted directly with the acid of formula IA in the presence of an acid agent such as sulfuric acid or p-toluene sulfonic acid. The esterification may also be effected with a diazoalkane corresponding to the desired ester in an organic solvent such as methylene chloride, chloroform, or dichloroethane. It is also possible to react an alkali metal salt such as potassium of the acid of formula IA with oxalyl chloride to form the acid chloride which is reacted with the desired alcohol in the presence of a tertiary amine such as triethylamine in an organic solvent such as benzene or toluene. Other methods of esterification consist of reaction of the alkali metal salt of the acid with an alkyl halide or by transesterification with the methyl ester of the acid.

The salts of the acids of formula IA can be prepared by known fashion by reaction with a mineral base such as sodium hydroxide or potassium hydroxide or with an organic base such as triethylamine.

The alkyl haloalkeneoates of formula III may be prepared as described in copending, commonly assigned U.S. patent application Ser. No. 138,275 filed Apr. 28, 1971 which comprises condensing a bromohaloalkane of the formula $$Br - (CH_2)_n - Hal' \quad \text{VIII}$$

wherein Hal' is bromine or chlorine and $n$ is 2, 3 or 4 with tetrahydropyranyl ether of propargyl alcohol in the presence of an alkali metal in liquid ammonia to form ($\alpha$-tetrahydropyranyloxy) haloalkyne of the formula

—O-CH$_2$-C≡C(CH$_2$)$_n$ - Hal'  IX reacting the latter with an alkali metal cyanide followed by hydrolysis in a basic media to obtain $\alpha$(tetrahydropyranyloxy) alkynoic acid of the formula

—O-CH$_2$ - C≡C - (CH$_2$)$_n$ - COOH  X reacting the latter with an esterification agent of a lower alkanol to form the corresponding ester of the acid of formula X, hydrolyzing the said ester in an acid media to remove the $\alpha$-tetrahydropyranyl group and hydrogenating the resulting alkyl hydroxyalkyneoate in the presence of a partially deactivated catalyst to obtain a compound of the formula $$HO-CH_2-CH=CH-(CH_2)_n - COOAlk'$$
XI and reacting the latter with a halogenating agent to obtain the corresponding alkyl haloalkeneoate of formula III.

The alkyl 3-(3'-$\alpha$-tetrahydro-pyranyloxy-trans 1'-alkenyl)-cyclopentanone-2-carboxylate of formula II can be prepared as described in copending, commonly assigned application Ser. No. 138,274 filed on Apr. 28, 1971 by reacting propargylacetic acid or a derivative thereof with a precursor agent for alkyl acetate to form alkyl 3-oxo-6-heptyneoate of the formula $$HC \equiv C - (CH_2)_2 - CO - CH_2 - COO\,AlK$$
XII wherein AlK is alkyl of 1 to 7 carbon atoms, reacting the latter with an etherification agent to form alkyl 3-alkoxy-6-yne-2-hepteneoate of the formula $$HC \equiv C - (CH_2)_2 - \overset{OAlK''}{\underset{}{C}} = CH - COOAlK \quad XIII$$

wherein AlK'' is alkyl of 1 to 7 carbon atoms, condensing the latter in the form of a metallic salt with a $\alpha$-haloalkanal of the formula $$CH_3 - (CH_2)_m - \underset{Hal''}{\overset{}{CH}} - CHO \quad XIV$$

wherein Hal'' is a bromine or chlorine and $m$ is 3, 4 or 5 to form a alkyl 3-alkoxy-8-hydroxy-9-halo-6-yne-2-alkenoate of the formula

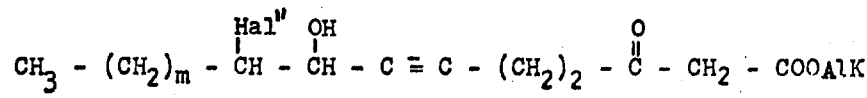

XV hydrolyzing the latter with an acid agent to form alkyl 3-oxo-8-hydroxy-9-halo-6-alkynoate of the formula

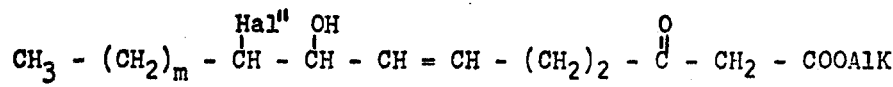

XVI hydrogenating the latter in the presence of a partially deactivated metallic catalyst to form alkyl 3-oxo-8-hydroxy-9-halo-cis 6-alkenoate of the formula $$CH_3 - (CH_2)_m - \underset{Hal''}{\overset{}{CH}} - \underset{OH}{\overset{}{CH}} - CH = CH - (CH_2)_2 - \overset{O}{\underset{}{C}} - CH_2 - COOAlK$$

XVII reacting the latter with an alkali metal alcoholate to form a trans epoxy-cis alkene of the formula

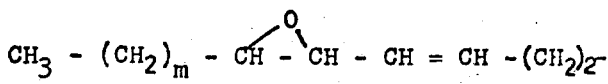
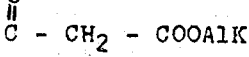

reacting the latter with a secondary amine to form the corresponding enamine which is cyclized in the presence of a basic agent to form alkyl 3-(3'-hydroxy-trans 1'-alkenyl)-cyclopentanone-2-carboxylate of the formula

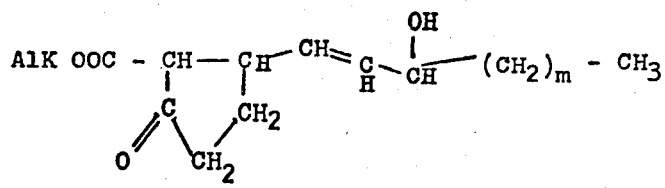

which is etherified by known methods to obtain the corresponding α-tetrahydropyranyl ether.

The compounds of formula I possess prostaglandin activity and it appears desirable that one can prepare in sufficient quantity to be used industrially a prostaglandin having the structure and configuration of the natural products and manifesting an improved stability or an increased duration of activity in relation to the natural compounds and above all present to a large degree the action of natural prostaglandins on smooth muscules, arterial tension, platelet aggregation or inhibition of mobilizatiotn of lipids.

The compounds of formula IA and their non-toxic, pharmaceutically acceptable salts manifest with respect to prostaglandin $A_2$ ($PGA_2$) a clearly increased hypotensive or antihypertensive activity and the same order of activity as prostaglandin $E_1$, a moderate contracturant activity on smooth muscule and an antagonist activity to the lipolytic effect of noradrenaline.

The compounds of formula IA are distinguished from prostaglandin $A_2$ by their properties on smooth muscles which prostaglandin $A_2$ does not possess and by their anti-lipolytic activity while prostaglandin $A_2$ is lipolytic. The increased pharmalogical activity is unexpected when one considers that dihydroprostaglandin $A_1$ (dihydro $PGA_1$) manifests a weaker hypotensive effect than prostaglandin $A_1$ as described by Pike et al. (Nobel Symposium on Prostaglandins, 1966).

The compounds of formula 1A and their nontoxic pharmaceutically acceptable salts are active against hypertension, atherosclerosis and circulatory troubles.

The pharmaceutical compositions of the invention may be in the form of drinkable or injectable solutions or suspensions, tablets, coated tablets, gelules, granules, sublingual tablets or suppositories prepared in the usual fashion.

The compounds may be administered orally, parenterally or rectally.

In the following examples there are described several preferred embodiments to illustrate the invention. However, it is to be understood that the invention is not intended to be limited to the specific embodiments.

EXAMPLE I

Preparation of ethyl 7-bromo-5-heptenoate

Step A: 6-(α-tetrahydropyranyloxy)-1-chloro-4-hexyne 0.77 g of lithium in the presence of a small amount of ferric nitrate as catalyst was added to 150 cc of ammonia, cooled to −35°C and the mixture remained in contact for 1 hour. Then, a solution of 14 g of pyranyl ether of propargyl alcohol [produced by the process of Conia, Bull. Soc. Chim., 1955, p. 1449] in 50 cc of ether were added thereto with stirring which was continued for 2 hours. Then, a solution of 15.7 g of 1-chloro-3-bromo-propane in 25 cc of ether were added thereto and the mixture was stirred for 3 hours at −35°C. The mixture was neutralized by the addition of 5.25 g of ammonium chloride and the ammonia was evaporated off. The residue was treated with ether saturated with water, then with water and was extracted with ether. The ether phase was washed with water, dried and evaporated to dryness to obtain 13 g of 6-(α-tetrahydropyranyloxy)-1-chloro-4-hexyne boiling at 100°C at 0.6 mm Hg and having a refractive index $[n]_D^{20} = 1.485$. The product occurred as a colorless liquid soluble in alcohols, ether, benzene and chloroform.

As far as is known, this compound is not described in the literature.

Step B: 7-(α-tetrahydropyranyloxy)-5-heptyne-nitrile

An aqueous solution of 13.6 g of potassium cyanide was added to 34.174 g of 6-(α-tetrahydropyranyloxy)-1-chloro-4-hexyne in 75 cc of dimethylformamide and the mixture was stirred for 8 hours at 80°C. After cooling, 100 cc of water were added to the reaction mixture which was extracted with ether. The ether phase was washed with water until the wash waters were neutral, dried over magnesium sulfate and evaporated to dryness to obtain 23 g of 7-(α-tetrahydropyranyloxy)-5-heptyne-nitrile boiling at 115°C at 0.1 mm Hg and having a refractive index of $[n]_D^{20} = 1.481$. The product occurred as a colorless liquid soluble in alcohols, ether, benzene and chloroform.

I R Spectrum:

Presence of tetrahydropyranyloxy and CN.

As far as is known, this compound is not described in the literature.

Step C: 7-(α-tetrahydropyranyloxy)-5-heptynoic acid

A mixture of 22.5 g of 7-(α-tetrahydropyranyloxy)-5-heptyne-nitrile, 9.5 g of potassium hydroxide and 120 cc of 50 percent ethanol was heated under a nitrogen atmosphere with stirring at 80°C for 18 hours and then the ethanol was removed under reduced pressure. 50 cc of water were added to the mixture which was iced and after the addition of 150 cc of ether, the pH was adjusted to 4 by addition of iced 0.5N hydrochloric acid. The ether phase was washed with water, dried over magnesium sulfate, filtered and evaporated to dryness under reduced pressure to obtain 21.3 g of 7-(α-tetrahydropyranyloxy)-5-heptynoic acid in the form of a colorless liquid having a refractive index $[n]_D^{20} = 1.485$. The liquid was soluble in alcohols, ether, benzene and chloroform and insoluble in water.

As far as is known, this compound is not described in the literature.

Step D: ethyl 7-(α-tetrahydropyranyloxy)-5-heptynoate

A mixture of 20g of 7-(α-tetrahydropyranyloxy)-5-heptynoic acid, 100 cc of methanol and 5.4 g of sodium methylate was stirred at room temperature for 1 hour and the methanol was evaporated off under reduced pressure to obtain 22 g of sodium 7-(α-tetrahydropyranyloxy)-5-hyptynoate. A mixture of 21 g of said sodium salt and 70 cc of dimethylformamide had added thereto 27.2 g of ethyl bromide. The reaction mixture was heated at 80° C for 2 hours with stirring and was then poured into water. The mixture was extracted with ether and the ether phase was washed with water, dried over magnesium sulfate and the solvent was evaporated off. The residue was fractionated to obtain 13g of ethyl 7-(α-tetrahydropyranyloxy)-5-heptynoate boiling at 122° C at 0.1 mm Hg and having a refractive index $[n]_D^{20} = 1.47$. The colorless liquid was soluble in alcohol, ether, benzene and chloroform and insoluble in water.

As far as is known, this compound is not described in the literature.

Step E: ethyl 7-hydroxy-5-heptynoate

A mixture of 10 g of ethyl 7-(α-tetrahydropyranyloxy)-5-hepynoate, 20 cc of ether, 5 cc of 25 percent sulfuric acid and 20 cc of methanol was stirred for 1 hour and then 30 cc of water were added thereto. The mixture was extracted with ether and the ether extracts were washed with water, dried over sodium carbonate and the ether was evaporated off under reduced pressure to obtain 4.3 g of ethyl 7-hydroxy-5heptynoate boiling at 91° C at 0.5 mm Hg and having a refractive index $[n]_D^{20} = 1.465$. The colorless liquid was soluble in alcohols, ether, benzene and chloroform and insoluble in water.

As far as is known, this compound is not described in the literature.

Step F: ethyl 7-hydroxy-5-heptenoate

A mixture of 300 mg of 5 percent palladium over barium sulfate in 20 cc of ethyl acetate was purged and a current of hydrogen was passed therethrough until 6 cc of hydrogen were absorbed. A solution of 4 g of ethyl 7-hydroxy-5-heptynoate in 7 cc of ethyl acetate containing 0.4 cc of quinolin was added thereto and the mixture was added washed with 14 cc of ethyl acetate. The mixture was purged and the current of hydrogen was passed therethrough until 570 cc of hydrogen were absorbed and the mixture was filtered and the filter was washed with ethyl acetate. The organic phase was washed with 0.5N hydrochloric acid, then with water, dried over magnesium sulfate, treated with activated carbon, filtered and evaporated to dryness to obtain 2.6 g of ethyl 7-hydroxy-5-heptenoate. The product occurred as a colorless liquid having a refractive index $[n]_D^{20} = 1.453$ and soluble in alcohols, ether, benzene and chloroform and insoluble in water.

As far as is known, this compound is not described in the literature.

Step G: ethyl 7-bromo-5-heptenoate

A solution of 2.9 g of phosphorus tribromide in 30 cc of petroleum ether was added with agitation to a mixture of 10 g of ethyl 7-hydroxy-5heptenoate and 120 cc of petroleum ether, cooled to −10° C and the mixture was stirred for 30 minutes at −10° C and 1 hour at 0° C. The reaction mixture was added to water and the mixture was extracted with ether. The ether extracts were washed with water until the wash waters were neutral, dried over magnesium sulfate and evaporated to dryness under reduced pressure to obtain 11.55 g of an oily product. The product was purified by passage through silica gel and elution with an 85–15 mixture of cyclo-hexane-ethyl acetate to obtain 9.73 g of ethyl 7-bromo-5-heptenoate in the form of a colorless liquid with a refractive index $[n]_D^{20} = 1.4825$. The product was soluble in alcohols, ether, benzene and chloroform and insoluble in water.

As far as is known, this compound is not described in the literature.

EXAMPLE II

Ethyl 7-hydroxy-5-heptynoate

A mixture of 20 g of 7-(α-tetrahydropyranyloxy)-5-heptynoic acid, 12 g of ethanol, 50 cc of benzene and 2 drops of concentrated sulfuric acid was refluxed under nitrogen for 3 hours and after letting the mixture return to room temperature, 20 cc of 12.5 percent sulfuric acid, 30 cc of ethanol and traces of sodium lauryl sulfate were added thereto. The mixture was stirred overnight at 20° C and was then neutralized with sodium carbonate. The mixture was extracted with ether and the ether extracts were dried and the solvent was evaporated off under reduced pressure. The residue was rectified to obtain 8.5 g of ethyl 7-hydroxy-5-heptynoate identical to that of Step E of Example I.

EXAMPLE III

Preparation of ethyl 3-(3'α-tetrahydropyranyloxy trans-1'-octenyl)-cyclopentanone-2-carboxylate Step A: ethyl 3-oxo-6-heptyneoate 7.3g of ethyl acid malonate (Bram et al, Bull. Soc. Chim., 1964, p. 945) were dissolved under a nitrogen atmosphere in 50 cc of tetrahydrofuran and then 0.10 mole of isopropyl magnesium bromide in solution in tetrahydrofuran was added. The mixture was heated slightly above room temperature while maintaining the nitrogen atmosphere to form solution A.

15 g of imidazole were dissolved in 100 cc of tetrahydrofuran and a solution of 6 g of thionyl chloride in 30 cc of tetrahydrofuran was added thereto. After stirring for 15 minutes, the mixture was filtered and the filter was washed with tetrahydrofuran to obtain a solution of N,N'-thionyldimidazole, 5 g of propargylacetic acid dissolved in 50 cc of tetrahydrofuran was added to the said solution and the mixture was stirred for 15 minutes at room temperature to obtain a solution of propargylacetylimidazole which was used as is.

Solution A was added to the solution of propargylacetylimidazole and the mixture was stirred overnight at room temperature. The mixture was acidified by addition of 4 percent hydrochloric acid and was extracted with ether. The ether phase was washed with an aqueous sodium bicarbonate solution, dried, treated with activated carbon, filtered and evaporated to dryness. The residue was passed through alumina with elution with methylene chloride to obtain 6.03 g of ethyl 3-oxo-6-heptynoate which was used as is for the next step.

The product occurred in the form of pale yellow prisms melting at 25°C and soluble in alcohols, ether, benzene and chloroform and insoluble in water.

As far as is known, this compound is not described in the literature.

Step B: ethyl-3-ethoxy-6-yne-2-heptenoate 30 cc of ethyl orthoformate and 0.35 cc of concentrated sulfuric acid were added to a solution of 10 g of ethyl 3-oxo-6-heptynoate in 60 cc of ethanol and 25 cc of solvent were distilled off in 45 minutes while bubbling nitrogen therethrough. After cooling the mixture, methylene chloride was added thereto and the mixture was washed with 2N sodium hydroxide. The mixture was extracted with methylene chloride and the organic phases were dried over sodium sulfate, treated with activated carbon, filtered and evaporated to dryness under reduced pressure. The residue was chromatographed over silica gel and elution with methylene chloride to obtain 7.05 g of ethyl 3-ethoxy-6yne-2-heptenoate. The product occurred in the form of a pale yellow liquid soluble in alcohols, ether, benzene and chloroform and insoluble in water.

As far as is known, this compound is not described in the literature.

Step C: ethyl 3-ethoxy-8-hydroxy-9-chloro-6-yne-2-tetradecenoate 9.25 cc of an ether solution of 1.085 N butyllithium were added to a mixture of 2 g of ethyl 3-ethoxy-6-yne-2-heptenoate and 15 cc of tetrahydrofuran cooled to −25°C and the mixture was left standing at −25°C for 1½ hours. After cooling the mixture to −30°C, 3 g of α-chloroheptanal (process of Krattiger, Bull. Soc. Chim., 1953, p. 222) were added thereto and the mixture stood for 30 minutes at −20°C, at 0°C for 30 minutes and then returned to room temperature. The reaction mixture was added to an iced aqueous solution of monosodium phosphate and was extracted with ether. The organic phase was washed with aqueous sodiium bicarbonate solution, then with water and finally with aqueous sodium chloride solution. The solution was dried over sodium sulfate, treated with activated carbon, filtered and evaporated to dryness. The residue was chromatographed over silica gel with elution with methylene chlorine containing 0.25 percent of acetone and then 0.5 percent acetone to obtain 1.85 g of ethyl 3-ethoxy-8-hydroxy-9-chloro-6-yne-2-tetradecenoate in the form of an amorphous pale yellow product soluble in alcohols and ether and insoluble in water.

Analysis: $C_{18}H_{29}O_4Cl$; molecular weight = 344.87
Calculated: % Cl   10.28
Found:               10.3

U.V. Spectrum (ethanol):
Max. at 237 m$\mu$   $E_{1\ cm}^{1\%} = 357$

As far as is known, this product is not described in the literature.

Step D: ethyl 3-oxo-8-hydroxy-9-chloro-6-tetradecynoate

A mixture of 6.95 g of ethyl 3-ethoxy-8-hydroxy-9-chloro-6-yne-2-tetradecenoate, 70 cc of ethanol and 35 cc of 2N hydrochloric acid was heated with stirring under a nitrogen atmosphere at 50°C for 1½ hours, and after cooling, water was added to the reaction mixture which was extracted with methylene chloride. The organic phase was washed with an aqueous sodium bicarbonate solution and then water until the wash waters were neutral, dried over sodium sulfate, filtered and evaporated to dryness under reduced pressure to obtain 6 g of raw ethyl 3-oxo-8-hydroxy-9-chloro-6-tetradecynoate. The product was purified by chromatograpy over silica gel and elution with a 70–30 mixture of cyclohexane-ethyl acetate to obtain pale yellow crystals soluble in alcohols and ether and insoluble in water.

Analysis: $C_{16}H_{25}O_4Cl$; molecular weight = 316.82
Calculated: % Cl   11.2
Found:               11.4

U.V. SPectra:
Ethanol max. at 244 m$\mu$; $E_{1\ cm}^{1\%} = 34$
Inflex. towards 279 m$\mu$; $E_{1cm}^{1\%} = 6$ Ethanol — 0.1N NaOH
Max. at 275 m$\mu$   $E_{1\ cm}^{1\%} = 668$ As far as is known, this product is not described in the literature.

Step E: ethyl 3-oxo-8-hydroxy-9-chloro-cis-6-tetradecenoate 240 mg of 5 percent palladium on barium sulfate were added to 15 cc of ethylacetate and a current of hydrogen was passed therethrough for 30 minutes. After absorption of 6 cc of hydrogen, a solution of 3.03 g of ethyl 3-oxo-8-hydroxy-9-chloro-6-tetradecynoate in 5 cc of ethyl acetate containing 0.3 cc of quinoline was added thereto and was washed with 15 cc of ehtyl acetate. The current of hydrogen was passed through the mixture for 2 hours and after absorption of 223 cc of hydrogen, the mixture was filtered. The filter was washed with ethyl acetate and the organic phase was washed with 0.5N hydrochloric acid, then with water and was dried over sodium sulfate, treated with activated carbon and filtered. The filtrate was evaporated to dryness under reduced pressure to obtain 3 g of ethyl 3-oxo-8-hydroxy-9-chloro-cis-6-tetradecenoate in the form of an amorphous, pale yellow product soluble in alcohols and ether and insoluble in water.

Analysis: $C_{16}H_{27}O_4Cl$; molecular weight = 318.84
Calculated: % C  60.27   % H 8.54   % Cl 11.12
Found:              60.0              8.4            10.8

U.V. Spectrum (ethanol):
Inflex. towards 226 m$\mu$   $E_{1\ cm}^{1\%} = 25$
Max. at 243 m$\mu$   $E_{1\ cm}^{1\%} = 32$ As far as is known, this compound is not described in the literature.

Step F: ethyl 3-oxo-trans-8,9-epoxy-cis-6-tetradeenoate 32 cc of a solution of 1N potassium tertiary butylate in tertiary butanol were added under nitrogen to a solution of 5 g of ethyl 3-oxo-8-hydroxy-9-chloro-cis-6-tetracecenoate in 50 cc of tertiary butanol and the mixture was stirred for 45 minutes. Methylene chloride was added thereto and the mixture was poured into a saturated aqueous solution of monosodium phosphate. The mixture was extracted with methylene chloride and the organic phase was washed with water, dried over sodium sulfate, treated with activated carbon, filtered and evaporated to dryness under reduced pressure. The residue was chromatographed over silica gel with elution with a 1:1 mixture of cyclohexane and ethyl acetate to obtain 3.4 g of ethyl 3-oxo-trans-8,9-epoxy-cis 6-tetradecenoate in the form of a pale yellow liquid, soluble in most of the usual organic solvents and insoluble in water.

Analysis: $C_{16}H_{26}O_4$; molecular weight = 282.38
Calculated:   %C 68.05   %H 9.28
Found:        68.3       9.4

U.V. spectrum (ethanol):
Max. at 246 mµ   $E_{1\ cm}^{1\%} = 49$

As far as is known, this compound is not described in the literature.

Step G: ethyl 3-N-pyrrolidyl-trans 8,9-epoxy-2-cis 6-tetradecadiencate

A mixture of 1.5 g of ethyl 3-oxo-trans 8,9-epoxy-cis 6-tetradeceroate, 15 cc of benzene, 1.5 cc of pyrrolidine and 75 mg of p-toluene sulfonic acid was purged with nitrogen and was then stirred at room temperature for 4 days. At the end of this time, the mixture was evaporated to dryness under reduced pressure and toluene was added to eliminate excess pyrrolidine. The residue was dissolved in methylene chloride and the organic phase was washed with water. The wash waters were re-extracted with methylene chloride and the combined methylene chloride phases were dried over magnesium sulfate, treated with activated carbon, filtered and evaporated to dryness under reduced pressure to obtain 1.9 g of ethyl 3-N-pyrrolidyl-trans 8,9-epoxy-2-cis 6-tetradecadienoate in the form of dark yellow amorphous solid soluble in alcohols and chloroform and insoluble in water.

Analysis: $C_{20}H_{23}O_3N$; molecular weight = 335.47
Calculated: %N  4.17
Found:          4.9

U.V. Spectrum (ethanol):
Inflex. towards 230 mµ   $E_{1\ cm}^{1\%} = 70$
Max. at 289–290 mµ      $E_{1\ cm}^{1\%} = 740$ IR Spectrum:
Absence of OH and bands at 1671, 1565, 1446 and 1443 cm$^{-1}$.

As far as is known, this compound is not described in the literature.

Step H: ethyl 3-(3'-hydroxy-trans 1'-octenyl)-cyclopentanone-2-carboxylate 4.3 g of sodium amide were added under nitrogen to 9.3 g of ethyl 3-N-pyrrolidyl-trans 8,9-epoxy-2 cis 6-tetradecadienoate in 110 cc of tetrahydrofuran and the mixture was stirred overnight at room temperature. The mixture was poured into an iced aqueous solution of monosodium phosphate and the mixture was extracted with methylene chloride. The organic phase was washed with water, dried over magnesium sulfate, treated with activated carbon, filtered and evaporated to dryness under reduced pressure. The residue was chromatographed over silica gel to obtain 3.4 g of ethyl 3-(3'-hydroxy-trans 1'-octenyl)-cyclopentanone-2-carboxylate in the form of a yellow liquid soluble in alcohols, ether, benzene and chloroform and insoluble in water.

Analysis: $C_{23}H_{28}O_9N_2$; molecular weight = 476.47 (dinitrobenzoate).
Calculated: %C, 57.98; %H, 5.88; %N, 5.88.
Found: %C, 57.8; %H, 6.0; %N, 6.1.

As far as is known, the compound is not described in the literature.

Step I: ethyl 3-(3'-α-tetrahydropyranyloxy-trans 1'-octenyl)-cyclopentanone-2-carboxylate Crystals crystals of p-toluene sulfonic acid and then 4 cc of dihydropyran were added to a solution of 3g of ethyl 3-(3'-hydroxy-trans 1'-octenyl) cyclopentanone-2-carboxylate in 10 cc of ether cooled to 0°C and the mixture was allowed to return to room temperature. The mixture was added to anhydrous sodium carbonate and was stirred for 1 hour under nitrogen. After filtration, the solvent and excess dihydropyran was evaporated off under reduced pressure to obtain 3.89 g of ethyl 3-(3'-α.tetrahydropyranyloxy-trans 1'-octenyl)-cyclpentanone-2-carboxylate in the form of a colorless liquid soluble in alcohols, ether and chloroform and insoluble in water.

Analysis: $C_{21}H_{34}O_5$; molecular weight = 366.
Calculated: %C, 68.85; %H, 9.29.
Found: %C, 68.9; %H, 9.0.

As far as is known, this compound is not described in the literature.

EXAMPLE IV

A mixture of 10.1 g of ethyl 3-oxo-6-heptynoate, 100 cc of ethanol, 20 cc of ethyl ortho formate and 1 g of p-toluene sulfonic acid was refluxed under nitrogen for 80 minutes and after cooling, methylene chloride was added to the mixture which was then poured into 100 cc of iced N sodium hydroxide. The organic phases were washed with iced N sodium hydroxide and then with an aqueous sodium chloride solution and the wash solutions were reextracted with methylene chloride. The combined organic phases were dried over sodium sulfate, filtered and evaporated to dryness under reduced pressure. The residue was subjected to chromatography over silica gel and elution with methylene chloride to obtain 6.716 g of ethyl 3-ethoxy-6-yne-2-heptenoate identical to that obtained in Step B of Example III.

EXAMPLE V

A mixture of 6.5 g of ethyl 3-ethoxy-6-yne-2-heptenoate and 110 cc of tetrahydrofuran was cooled to −60°C and then 29 cc of a solution of 1.6 N butyllithium in hexane was added thereto while stirring for 3 hours. 9.7 g of α-chloroheptanal in 25 cc of tetrahydrofuran were added thereto and the mixture was stirred for 1 hour at −60°C, then was allowed to return to 0°C. The reaction mixture was added to an iced saturated aqueous solution of monosodium phosphate and the mixture was extracted with ether. The ether phase was washed with an aqueous solution saturated with sodium bicarbonate, then with water until the wash waters were neutral, dried over magnesium sulfate and evaporated to dryness.

The residue was dissolved in 100 cc of ethanol and 56.5 cc of 2 N hydrochloric acid and the mixture was stirred under a nitrogen atmosphere at 50° to 60°C for 1½ hours. After cooling, the solution was added to a water-ice mixture and was extracted with ether. The ether phase was washed with water until the wash waters were neutral, dried over magnesium sulfate and evaporated to dryness to obtain 16 g of raw ethyl 3-oxo-8-hydroxy-9-chloro-6-tetradecynoate.

Volatile products contained in the 16 g of raw product were removed by distillation under reduced pressure and at the end of the distillation, the residue was cooled and was taken up in ether. The solution was treated with activated carbon, filtered and evaporated to dryness. The residue was dissolved in 5 cc of isopropyl ether and was added to 4 volumes of petroleum ether with agitation. The solution was cooled to $-60°C$ and petroleum ether was added until there was formation of a deposit and was decanted.

A mixture of the said deposit in 22 cc of ethanol and 113 cc of a saturated cupric acetate solution was stirred overnight and then decanted. The cupric complex formed was washed with water and vacuum filtered. The complex was suspended in petroleum ether and was stirred for 1 hour in an ice-water bath. The mixture was filtered and the filter was washed with iced petroleum ether and then an iced 2–1 mixture of petroleum ether and ether. The precipitate was dissolved in methylene chloride and the solution was acidified with dilute acetic acid and added to methylene, chloride. The methylene chloride phase was washed with water, then with an aqueous sodium bicarbonate solution and then with water until the wash waters were neutral. The solution was dried over magnesium sulfate and evaporated to dryness to obtain ethyl 3-oxo-8-hydroxy-9-chloro-6-tetradecynoate identical to that of Step D of Example III.

EXAMPLE VI

Preparation of methyl 15α-hydroxy -9-oxo-5-cis 13 -trans prostadienoate

Step A: ethyl 15α - (α - tetrahydropyranyloxy) - 9 - oxo - 8 - carbethoxy - 5 - cis 13 - trans prostadienoate A solution of 3.3 g of ethyl 3-(3'α-tetrahydropyranyloxy-trans 1'-octenyl)-cyclopentanone-2-carboxylate in 15 cc of benzene was admixed with 1.165 g of potassium tert.-butylate under a nitrogen atmosphere with stirring at room temperature for 1 hour and then a solution of 2.76 g of ethyl 7-bromo-5-heptenoate in 5 cc of benzene was added to the reaction mixture which was allowed to stand at room temperature for 24 hours. The reaction mixture was poured into an aqueous solution of iced monosodium phosphate and the mixture was extracted with methylene chloride. The organic phase was washed with water until the wash water was neutral and the wash waters were reextracted with methylene chloride. The combined organic phases were dried over magnesium sulfate and evaporated to dryness. The residue was chromatographed through silica gel and eluted with a 80–20 mixture of cyclohexane-ethyl acetate to obtain 3.9 g of ethyl 15α-(α-tetrahydropyranyloxy)-9-oxo-8-carbethoxy-5-cis 13-trans prostadienoate in the form of a colorless liquid soluble in organic solvents and insoluble in water.

Analysis: $C_{30}H_{48}O_7$; molecular weight = 520
Calculated: % C 69.23 % H 9.23
Found: 68.9 9.2

IR Spectrum:
Presence of carbonyl at 1727 and $1746^{cm-1}$.

As far as is known, this compound is not described in the literature.

Step B: ethyl 15α - (α - - tetrahydropyranyloxy) - 10 - carbethoxy - 9 - oxo - 5 - cis 13 - trans prostadienoate A mixtuure of 2.8 g of ethyl 15α-(α-tetrahydropyranyloxy)-9-oxo-8-carbethoxy-5-cis 13-trans prostadienoate and 5.6 cc of an alcoholic solution of 1.02 N sodium ethylate was refluxed for 7 hours and after cooling, 20 cc of toluene added thereto. The alcohol was azeotropically distilled off at the attained temperature of 110° C. The reaction mixture was strongly cooled and then was poured into an aqueous solution of monosodium phosphate with agitation. The mixture was extracted with ether and the organic phase was washed with water, dried over magnesium sulfate and the solvent was evaporated off under reduced pressure. The residue was chromatographed over silica gel and eluted with a 90–10 mixture of cyclohexane-ethyl acetate containing 0.1 percent triethylamine to obtain 2.3 g of ethyl 15α-(α-tetrahydropyranyloxy)-10-carbethoxy-9-oxo-5-cis 13-trans prostadienoate in the form of a colorless liquid soluble in organic solvents and insoluble in water.

Analysis: $C_{30}H_{48}O_7$; molecular weight = 520
Calculated: % C 69.23 % H 9.23
Found: 69.4 8.9

As far as is known, this compound is not described in the literature.

Step C: 15α hydroxy - 9 - oxo - 5 - cis 13 - trans prostadienoic Acid

A mixture of 390 mg of ethyl 15α-(α-tetrahydropyranyloxy)-10-carbethoxy-9-oxo-5-cis 13-trans prostadienoate, 7.5 cc of 0.3 N sodium hydroxide and 1 cc of methanol stood under a nitrogen atmosphere at room temperature for 40 hours and the methanol was removed by evaporation at a reduced pressure at a temperature below 40° C. The mixture was extracted with ether, iced and the aqueous phase was saturated with sodium chloride and acidified by addition of iced N hydrochloric acid. The aqueous phase was extracted with ether and the combined organic phases were washed with water until the wash water were neutral, dried over magnesium sulfate and evaporated to dryness at a temperature below 30° C to obtain 15α-(α-tetrahydropyranyloxy)-10-carboxy-9-oxo-5-cis 13-trans prostadienoic acid which, as far as is known, is not described in the literature.

The residue dissolved in 10 cc of benzene was refluxed for 30 minutes and evaporated to dryness to obtain a residue of 15α-(α-tetrahydropyranyloxy)-9-oxo-5-cis 13-trans prostadienoic acid which is not described in the literature.

5.5 cc of an aqueous solution of 2 percent oxalic acid were added to the said residue dissolved in 8 cc of ethanol and the reaction mixture stood overnight at room temperature. The ethanol was eliminated by evaporation under reduced pressure and the mixture was extracted with ether. The ether phase was washed with water until the wash waters were neutral and evaporated to dryness. The residue was chromatographed over silica gel and eluted with a 40–6–1 mixture of cyclohexane-ethylacetate-acetic acid to obtain 131 mg of 15-α-hydroxy-9-oxo-5-cis 13-trans prostadienoic acid.

As far as is known, this compound is not described in the literature.

Step D: methyl 15α - hydroxy - 9 - oxo - 5 - cis 13 - trans prostadienoate

The 131 mg of product from Step C was esterified with diazomethane in methylene chloride solution and the product was chromatographed over silica gel and eluted with a 70–30 mixture of cyclohexane and ethyl acetate to obtain 130 mg of methyl 15α-hydroxy-9-oxo-5-cis 13-trans prostadienoate in the form of a colorless liquid soluble in organic solvents and insoluble in water.

Analysis: $C_{21}H_{34}O_4$; molecular weight = 350
Calculated: % C 72.0 % H 9.7
Found: 71.9 9.7

IR Spectrum:
Presence of OH at $3600^{cm-1}$ and of carbonyl at $1734^{cm-1}$.

As far as is known, this compound is not described in the literature.

Step E: sodium 15α-hydroxy-9-oxo-5-cis 13-trans prostadienoate 300 mg of 15α-hydroxy-9-oxo-5-cis 13-trans prostadienoic acid were neutralized by addition of 8.7 cc of a 1N solution of sodium hydroxide and the mixture was extracted with ether. The resulting acid was removed by ether extraction and then the water was evaporated under reduced pressure to obtain 305 mg of sodium 15α-hydroxy-9-oxo-5-cis 13-trans prostadienoate in the form of a very thick, yellow oil.

Analysis: $C_{20}H_{31}O_4Na$; molecular weight = 358
Calculated: % C 67.03 % H 8.65
Found: 66.7 8.9

As far as is known, this compound is not described in the literature.

PHARMACOLOGICAL DATA

A. Hypotensive and Adrenolytic Activity in Rabbits

Methyl 15α-hydroxy-9-oxo-5-cis 13-trans prostadienoate was administered intravenously in solution in physiological serum containing 20 percent ethanol to rabbits anesthesized with urethane and the carotidien pressure, electrocardiogram and response to adrenalin were determined by recordings and the results are reported in Table I.

TABLE I

| Doses administered in γ/kg | 1 | 2 | 5 | 10 | 20 | 50 |
|---|---|---|---|---|---|---|
| Hypotension | | | | | | |
| % of diminution | 20 | 20 | 40 | 55 | 60 | 75 |
| Duration in min. | 2 | 2 | 4 | 6 | 10 | 10 |
| % of diminution of hypertension due to adrenaline | 0 | 40 | 70 | 50 | 75 | 80 |
| Electrocardiogram | 0 | 0 | 0 | 0 | 1 arrhythmia over 2 | |

The results of Table I show that the dose of said product which lowers the carotidin pressure in the rabbit is less than 5γ per kg and the adrenolytic action is manifested beginning at 10γ per kg. One did not observe at the clearly hypotensive doses the tachycardia signalized in dogs with other prostaglandins.

B. Contracture Activity on the Guinea Pig Isolated Ileum

This test is effected on the isolated ileum of the guinea pig in a trough containing 10 cc of Tyrode liquid and under constant oxygenation. The test determined the concentration of the test product provoked a concentration of the organ comparable to that provoked by 10γ/cc of acetylcholine. Methyl 15α-hydroxy-9-oxo-5-cis 13-trans prostadienoate had an average contracture dose in the test of 5γ per cc.

C. Antilipolytic Activity

This test was effected with groups of male rats weighing about 200 g which were starved for 18 hours before the test and the test compound dissolved in 25 percent ethanol was administered intravenously at doses of 100 and 500 γ/kg. A sample of blood was taken 7 minutes and 15 minutes after the injection and the proportion of free fatty acids was determined. The results with methyl 15α-hydroxy-9-oxo-5-cis 13-trans prostadienoate are reported in Table II.

TABLE II

| | μmol/cm3 of Plasma | |
|---|---|---|
| Doses administered | 100γ/kg | 500γ/kg |
| At time 0 | 0.46 | 0.46 |
| After 7 minutes | 0.58 | 0.53 |
| After 15 minutes | 0.48 | 0.54 |

Table II shows that the said compound did not have any diminution of the ratio of free fatty acids.

In a second test, in order to increase lipidic mobilization, 500γ/kg of noradrenaline were administered intraperitoneally to the rats previously starved for 18 hours 20 minutes before the sampling of the blood. Methyl 15α-hydroxy-9-oxo-5-cis 13-trans prostadienoate was administered to the rats 10 minutes before the blood sampling. One group of rats served as controls, one group received only noradrenalin, a third group received noradrenaline and the solvent of 25 percent ethanol and the fourth group received noradrenaline and 500γ/kg of the test compound in 25 percent ethanol. The results are reported in Table III.

TABLE III

| Lots | Doses in γ/kg | Free fatty acids in μmol/cm3 of plasma |
|---|---|---|
| Controls | 0 | 0.65 |
| Noradrenaline | 500 | 1.00 |
| Noradrenaline + 25% ethanol | 500 | 1.00 |
| Noradrenaline + test product | 500 500+ | 0.65(−35%) |

The results of Table III shows that the test compound administered at a dose of 500 γ/kg opposes the action of noradrenaline.

D. Hyperglycemiant Activity

Russian male rabbits weighing about 2 kg received intravenously 50 or 500γ of methyl 15α-hydroxy-9-oxo-5-cis 13-trans prostadienoate in ethanol solution and the animals were not starved. Blood samples were taken at the time of injection and 30 and 60 minutes after the injection. The results are shown in Table IV.

TABLE IV

| Lots | Controls | Test Products | |
|---|---|---|---|
| Doses in γ/kg | 0 | 50 γ | 100γ |
| Glucose in g/per liter of blood | | | |
| Time  0 | 1.74 | 1.27 | 1.18 |
| 30 min. | 1.40 | 1.29 | 1.27 |
| 60 min. | 1.23 | 1.25 | 1.22 |

In a second test under the conditions with fasting animals, the blood samples were taken at the moment of injection of 100γ of the same product and 30, 60 and 120 minutes after the injection. The results are reported in Table V.

TABLE V

| Lots | Controls | Test Products |
|---|---|---|
| Doses in γ/kg | 0 | 100γ |
| Glucose in g/per liter of blood | | |
| Time  0 | 1.08 | 1.16 |
| 30 min | 1.15 | 1.31 |
| 60 min | 1.03 | 1.21 |
| 120 min | 0.91 | 1.08 |

These results show that the test compound maintained the ratio of glycemia at a dose of 50γ in the animals in a digestive period and sensibly increased the ratio at a dose of 100γ in a fasting animal.

Various modifications of the compounds and process of the invention may be made without departing from the spirit or scope thereof and it should be understood that the invention is to be limited only as defined in the appended claims.

We claim:

1. A prostanoic acid compound of the formula

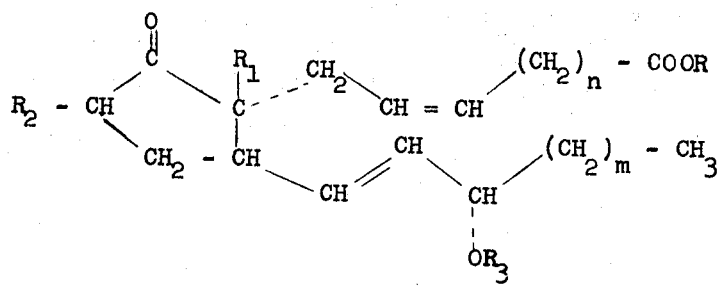

wherein R is selected from the group consisting of hydrogen and alkyl of 1 to 7 carbon atoms, $R_1$ is selected from the group consisting of hydrogen and carbalkoxy of 1 to 7 alkyl carbon atoms, $R_2$ is selected from the group consisting of hydrogen, carboxy and carbalkoxy of 1 to 7 alkyl carbon atoms, $R_3$ is selected from the group consisting of hydrogen and α-tetrahydropyranyl, $m$ is 3, 4 or 5 and $n$ is 2, 3 or 4 with the proviso that when $R_1$ is carbalkoxy, R is alkyl of 1 to 7 carbon atoms, $R_2$ is hydrogen and $R_3$ is α-tetrahydro-pyranyl; when $R_2$ is carbalkoxy, R is alkyl of 1 to 7 carbon atoms, $R_1$ is hydrogen and $R_3$ is α-tetrahydropyranyl and when $R_2$ is carboxy, R and $R_1$ are hydrogen and $R_3$ is α-tetrahydropyranyl and when R is hydrogen, at least one of $R_1$, $R_2$ and $R_3$ is other than hydrogen.

2. A compound of claim 1 having the formula

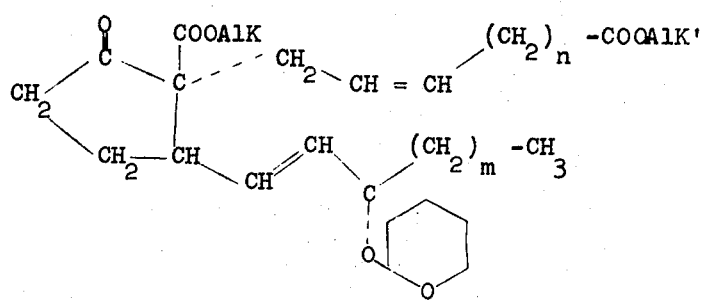

wherein AlK and AlK' are alkyl of 1 to 7 carbon atoms, $m$ is 3, 4 or 5 and $n$ is 2, 3 or 4.

3. A compound of claim 2 which is ethyl 15α-(α-tetrahydropyranyloxy)-9-oxo-8-carbethoxy-5-cis 13-trans prostadienoate.

4. A compound of claim 1 having the formula

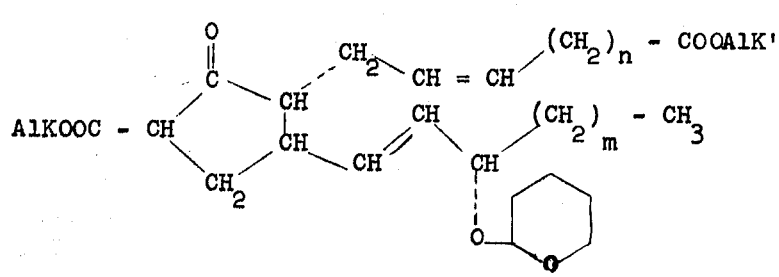

wherein AlK and AlK' are alkyl of 1 to 7 carbon atoms, $n$ is 2, 3 or 4 and $m$ is 3, 4 or 5.

5. A compound of claim 4 which is ethyl 15α-(α-tetrahydropyranloxy)-10-carbethoxy-9-oxo-5-cis 13-trans prostadienoate.

6. A compound of claim 1 having the formula

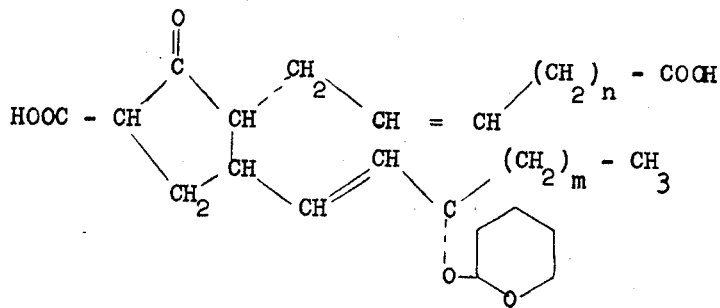

wherein n is 2, 3 or 4 and m is 3, 4 or 5.

7. A compound of claim 6 which is 15α-(α-tetrahydropyranyloxy)-10-carboxy-9-oxo-5-cis 13-trans prostadienoic acid.

8. A compound of claim 1 which 15α-(α-tetrahydropyranyloxy)-9-oxo-5-cis 13-trans prostadienoic acid.

9. A process for the preparation of the compound of claim 2 comprising condensing in the presence of an alkaline agent an alkyl 3-alkenyl-cyclopentanone-2-carboxylate of the formula wherein Alk is alkyl of 1 to 7 carbon atoms and m is 3, 4 or 5 with an alkyl haloalkenoate of the formula
Hal — $CH_2$ — CH = CH = $(CH_2)_n$ — COOAlk' wherein Hal is chlorine or bromine and Alk' is alkyl of 1 to 7 carbon atoms to form the said prostadienoate.

10. The process of claim 9 wherein the prostadienoate is reacted with an alkali metal alcoholate to form the corresponding 10-carboalkoxy-prostadienoate of claim 4.

11. The process of claim 10 wherein the said 10-carboalkoxy-prostadienoate is saponified with a basic agent to form the corresponding acid of claim 6.

12. A process for the preparation of a compound of claim 4 comprising reacting a compound of the formula

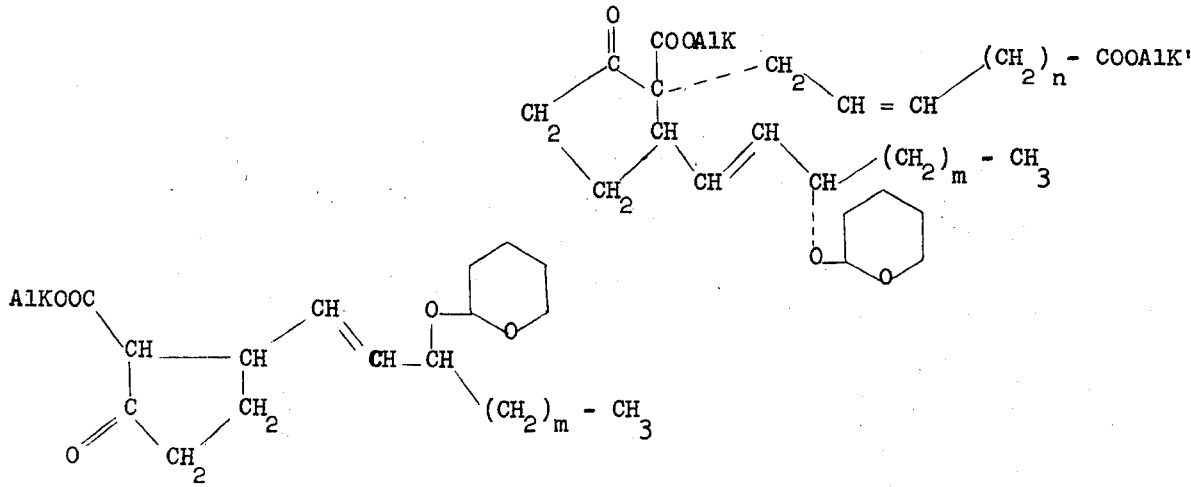

wherein Alk' is alkyl of 1 to 7 carbon atoms, n is 2,3 or 4 and m is 3,4 or 5 with an alkali metal alcoholate.

* * * * *